United States Patent [19]

Tibbet

[11] Patent Number: 5,685,060
[45] Date of Patent: Nov. 11, 1997

[54] WORKPIECE HOLDING ASSEMBLY METHOD

[75] Inventor: Michael D. Tibbet, Ventura, Calif.

[73] Assignee: Gaiser Tool Company, Ventura, Calif.

[21] Appl. No.: 468,063

[22] Filed: Jun. 6, 1995

Related U.S. Application Data

[62] Division of Ser. No. 288,067, Aug. 10, 1994, Pat. No. 5,487,538.

[51] Int. Cl.$^6$ ............................................. B23Q 1/04
[52] U.S. Cl. ............................ 29/559; 269/71; 269/82
[58] Field of Search ........................ 269/60, 61, 71, 269/73, 82, 45, 303, 304, 309, 315, 900; 29/559

[56] References Cited

U.S. PATENT DOCUMENTS

| | | | |
|---|---|---|---|
| 4,317,560 | 3/1982 | Troyen | 269/71 |
| 4,422,628 | 12/1983 | Kasai | 269/71 |
| 4,577,846 | 3/1986 | Buchler | 269/82 |
| 5,019,129 | 5/1991 | Johanson | 269/71 |

*Primary Examiner*—Robert C. Watson
*Attorney, Agent, or Firm*—Kenneth J. Hovet

[57] ABSTRACT

A workpiece holding assembly for a machine apparatus is provided having an adjustable rail clamp attached to a rail which is secured to a work table of the apparatus. The rail is provided with front and back side referencing surfaces and the rail clamp includes an inner channel having an inside wall which comprises a reference surface for engagement with either the front or back side surfaces of the rail. The rail clamp includes a rail fastener means which functions to create a downward and inward force component which securely draws the inside wall against the rail reference surfaces to ensure a solid rigid connection. The rail clamp further is provided with a leveler connector means providing a quick release with a leveler head. The leveler head is provided with a connector portion that forms a corresponding connection with the leveler connector means. The leveler connector means includes a manually operated lever that draws the leveler head and rail clamp together so that reference surfaces become rigidly engaged in a manner to orient the leveler head in a predetermined relationship relative to the rail. The leveler head includes a cant adjustment means. The leveler head further includes a horizontal adjustment means comprising a cam. The leveler head also includes a vertical adjustment screw.

4 Claims, 4 Drawing Sheets

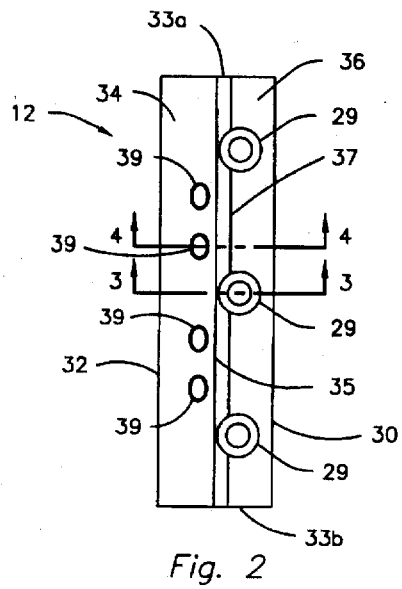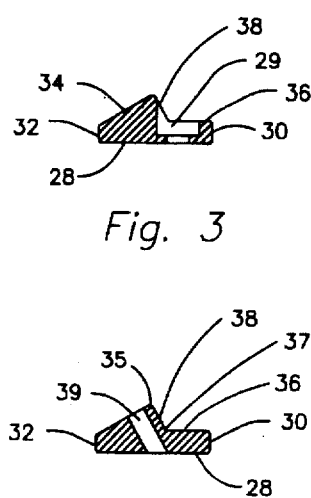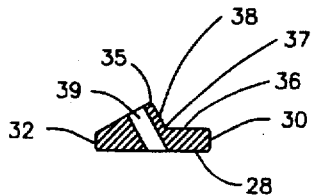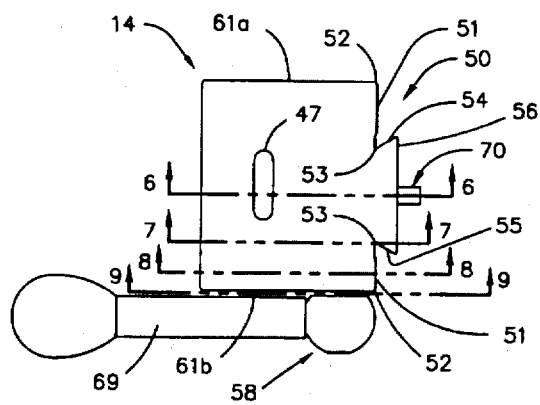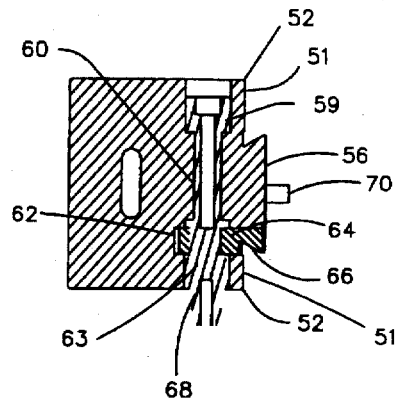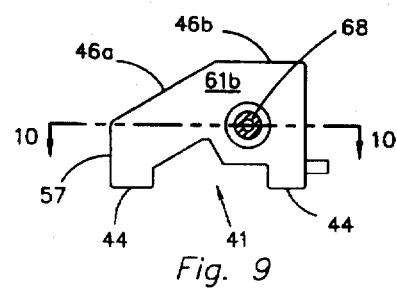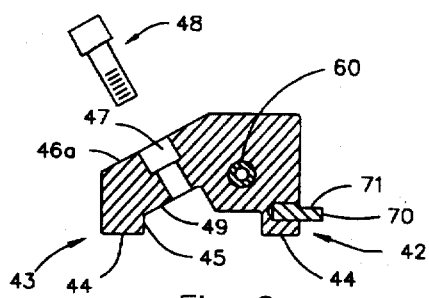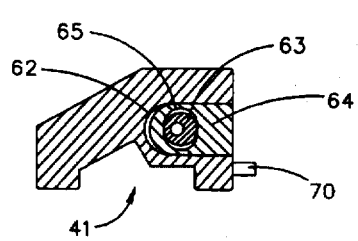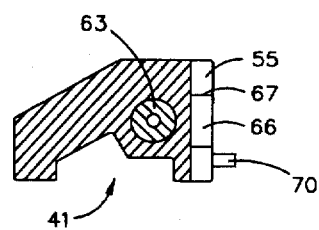

WORKPIECE HOLDING ASSEMBLY METHOD

This application is a division of application Ser. No. 08/288,067, filed Aug. 10, 1994, now U.S. Pat. No. 5,487,538.

BACKGROUND OF THE INVENTION

1. Field of the Invention

The present invention concerns means for positioning a workpiece within the operating area of a machining apparatus. In particular, the invention relates to a multi-component assembly for adjustably and repeatably locating a workpiece at a precise location relative to a machine tool.

2. Description of the Prior Art

As the level of technology has increased, the requirement for more complicated, detailed and precision made parts has likewise increased. To produce such parts, a machining technology has evolved termed "wire electrical discharge machining" or wire EDM. This technology permits the machining of complicated geometric shapes from particularly hard and difficult to cut electrically conductive materials.

A problem with such machines, however, is that only one part at a time can be machined. Also, the cutting speed of a wire EDM machine is relatively slow. These disadvantages, plus the high cost of wire EDM machines, induce a manufacturer to enhance the effectiveness of the machine as much as possible.

As a partial resolution to the above problems, operators are learning to pre-rig a workpiece within a clamping assembly while the machine is simultaneously operating on another workpiece. In this way, the workpiece changeover time is significantly reduced and the efficiency of the machine is greatly enhanced.

A difficulty with the above procedure is being able to quickly and precisely locate the workpiece relative to the wire or machine tool on a consistent and repetitive basis. This difficulty has been addressed in U.S. Pat. Nos. 4,656,326 and 4,786,776. Each of these patents describe a complicated assembly of numerous parts which all fit together from the surface of the machine tool table. The patents show the use of multiple plates, bridge parts, large reference blocks, miscellaneous braces and slotted clamps. Not only are the above parts cumbersome and difficult to adjust, if just one of the many parts becomes misaligned or in some way distorted, each of the successive parts becomes exaggerated in misalignment. Further, such systems are expensive and time-consuming to use.

SUMMARY OF THE INVENTION

The present invention provides an assembly for holding a workpiece which can be assembled and placed within the machine operating area with a high degree of accuracy. Additionally, the claimed assembly is simple to use and can engage a workpiece in a highly rigid manner which is substantially impervious to distortion or misguided connections. It also provides the ability to pre-rig a variety of workpieces outside the machine for subsequent precise placement within the machine with a minimum of time and low-skilled effort.

The invention provides a base module, which is secured to the machine table, and a release module which is detachably connected to the base module. The modules comprise three basic components which adjustably interconnect in a cooperating relationship to each other and to a workpiece clamping means. The first component comprises a uniquely beveled rail which is attached to the machine work table relative to predetermined reference lines. The second component comprises a rail clamp that adjustably attaches to the rail. The clamp includes a large surface area that references against a like area on the rail to provide a repeatable, stable and precisely aligned connection thereto. The clamp also includes a lever-actuated release means that allows quick and easy detachment from the third component.

The third component comprises a leveler head which includes both a vertical and cant adjustment means. These adjustment means are designed to interact with the attachment region of a workpiece clamping means. The leveler head further includes reference surfaces for engagement with corresponding surfaces on the workpiece clamping means and the rail clamp. In this way, each component will be referenced to each other and to the predetermined reference lines of the machining apparatus. With the above three components, it follows that any workpiece secured in the workpiece clamping means is capable of being accurately located at any desired position relative to a machine tool or the wire of an EDM machine.

BRIEF DESCRIPTION OF THE DRAWINGS

FIG. 2 is a top plan view of the rail of the invention shown in FIG. 1.

FIG. 3 is a cross-sectional view taken along lines 3—3 of FIG. 2.

FIG. 4 is a cross-sectional view taken along lines 4—4 of FIG. 2.

FIG. 5 is a top plan view of the rail clamp of the invention shown in FIG. 1.

FIG. 6 is a cross-sectional view taken along lines 6—6 of FIG. 5.

FIG. 7 is a cross-sectional view taken along lines 7—7 of FIG. 5.

FIG. 8 is a cross-sectional view taken along lines 8—8 of FIG. 5.

FIG. 9 is an end elevation view taken along lines 9—9 of FIG. 5.

FIG. 10 is a cross-sectional view taken along lines 10—10 of FIG. 9.

DESCRIPTION OF THE PREFERRED EMBODIMENTS

Figure 1:
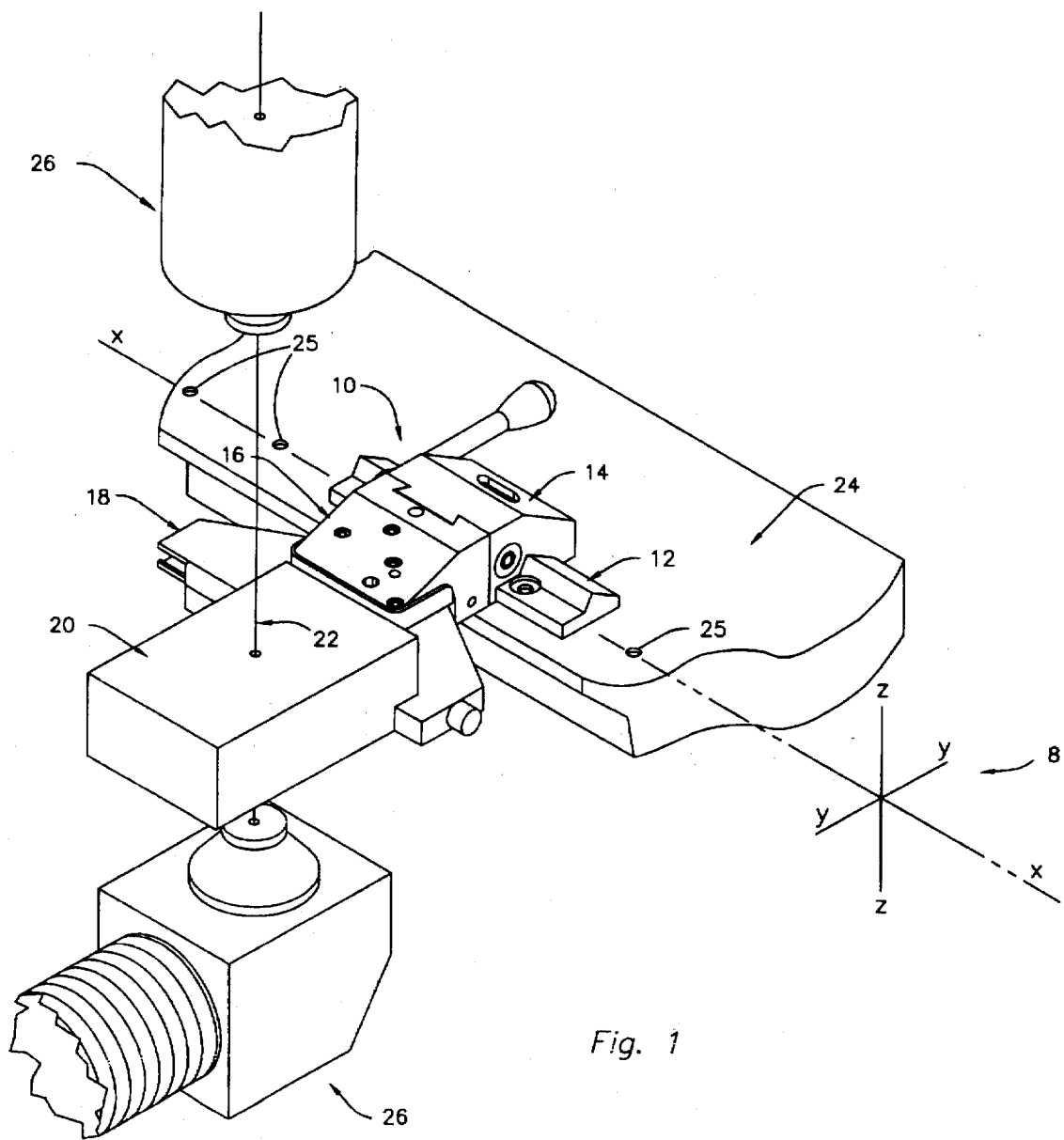
FIG. 1 is a fragmentary isometric view showing three components of the invention connected to a workpiece clamping means which is holding a workpiece within the operating area of a wire electrical discharge machining apparatus.
Figure 14:
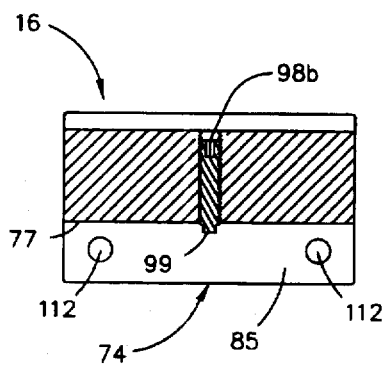
FIG. 14 is a cross-sectional view taken along lines 14—14 of FIG. 11.
Figure 13:
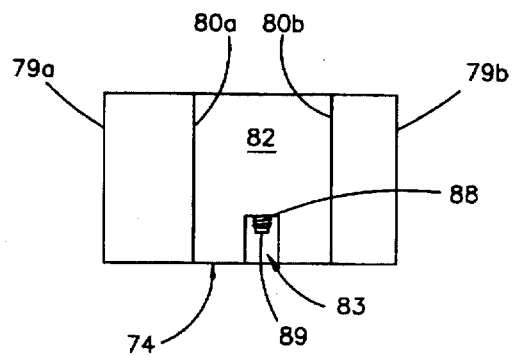
FIG. 13 is a left end elevational view of the leveler head shown in FIG. 11.
Figure 15:
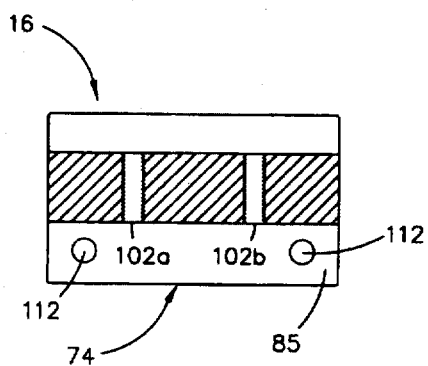
FIG. 15 is a cross-sectional view taken along lines 15—15 of FIG. 11.
Figure 11:
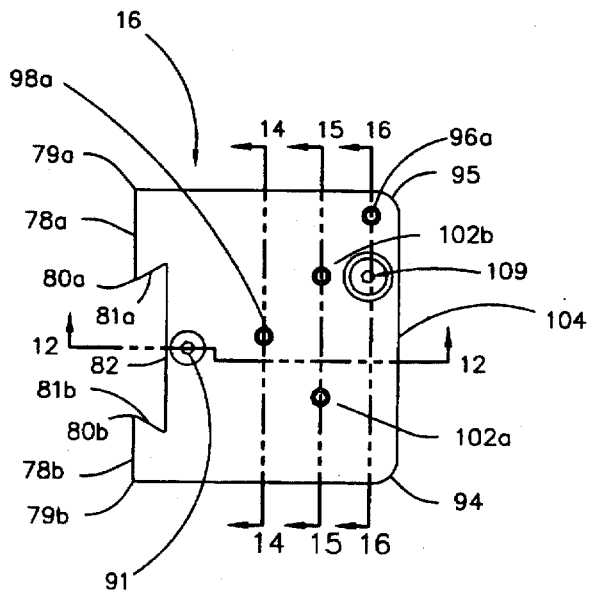
FIG. 11 is a top plan view of the leveler head of the invention shown in FIG. 1.
Figure 16:
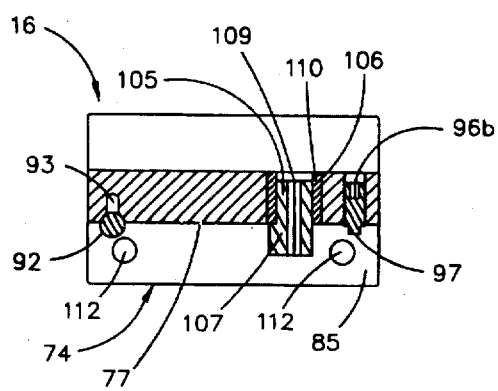
FIG. 16 is a cross-sectional view taken along lines 16—16 of FIG. 11.
Figure 12:
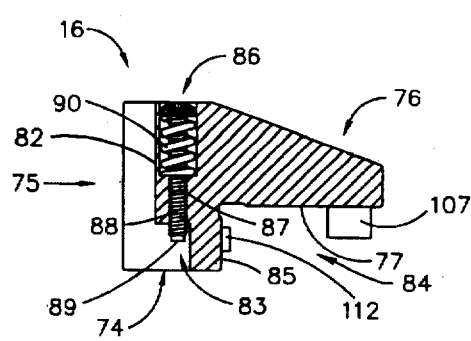
FIG. 12 is a cross-sectional view taken along lines 12—12 of FIG. 11.

With reference now FIG. 1, the overall assembly 10 of the invention is shown relative to its use on a wire EDM apparatus 26. The apparatus includes the operative tool, shown as wire 22, which operates upon a workpiece 20. The workpiece is held in place by a workpiece clamping means 18 which is secured in a predetermined fashion to the three component assembly of the invention.

More particularly, the assembly comprises a leveler head 16 which is removably attached to a rail clamp 14. The rail clamp is adjustably secured to rail 12 which, in turn, is secured to top surface 24 of the machining apparatus.

As shown in FIG. 1, the top surface is provided with surface openings 25 which are spaced-apart and aligned precisely along a predetermined x axis. The x axis is orthogonally referenced to a y and z axis, shown by reference 8, which correspond to the exact position of machining wire 22. Thus, by providing a reference surface on rail 12 which is parallel to the x or y axis and, by providing corresponding orthogonal reference surfaces on each of the rail clamp, leveler head and workpiece clamping means, a workpiece can be precisely located relative to the machine tool.

With reference now to FIG. 2, the structure of rail 12 will be described. Overall, it comprises a solid elongated part having a flat bottom surface 28. Extending perpendicularly from the bottom surface are front side surface 30 and back side surface 32. The side surfaces are parallel to each other so that when the rail is aligned along the aforementioned x axis, both the front and back side surfaces will likewise extend parallel to the x axis. Further, since the side surfaces extend perpendicular to the table surface, they will be in alignment with the z axis of the machine.

The rail is provided with end walls 33a,b which are parallel to each other and extend perpendicular to bottom surface 28. Additionally, the end walls extend perpendicular to the side surfaces so that the plane of their surfaces will extend parallel to the y axis of the machine.

Inclining upwardly and inwardly from backside surface 32, is oblique top surface 34. The oblique top surface extends up to a ridge line 35 which extends longitudinally from each end wall of the rail.

The rail includes a front top surface 36 which extends from front side surface 30 inwardly to a merger corner 37. Inclined upwardly from the merger corner to ridge line 35 is a front face surface 38. Each of the aforementioned rail surfaces are preferably flat and extend uniformly along the longitudinal axis of the rail.

Figure 17:
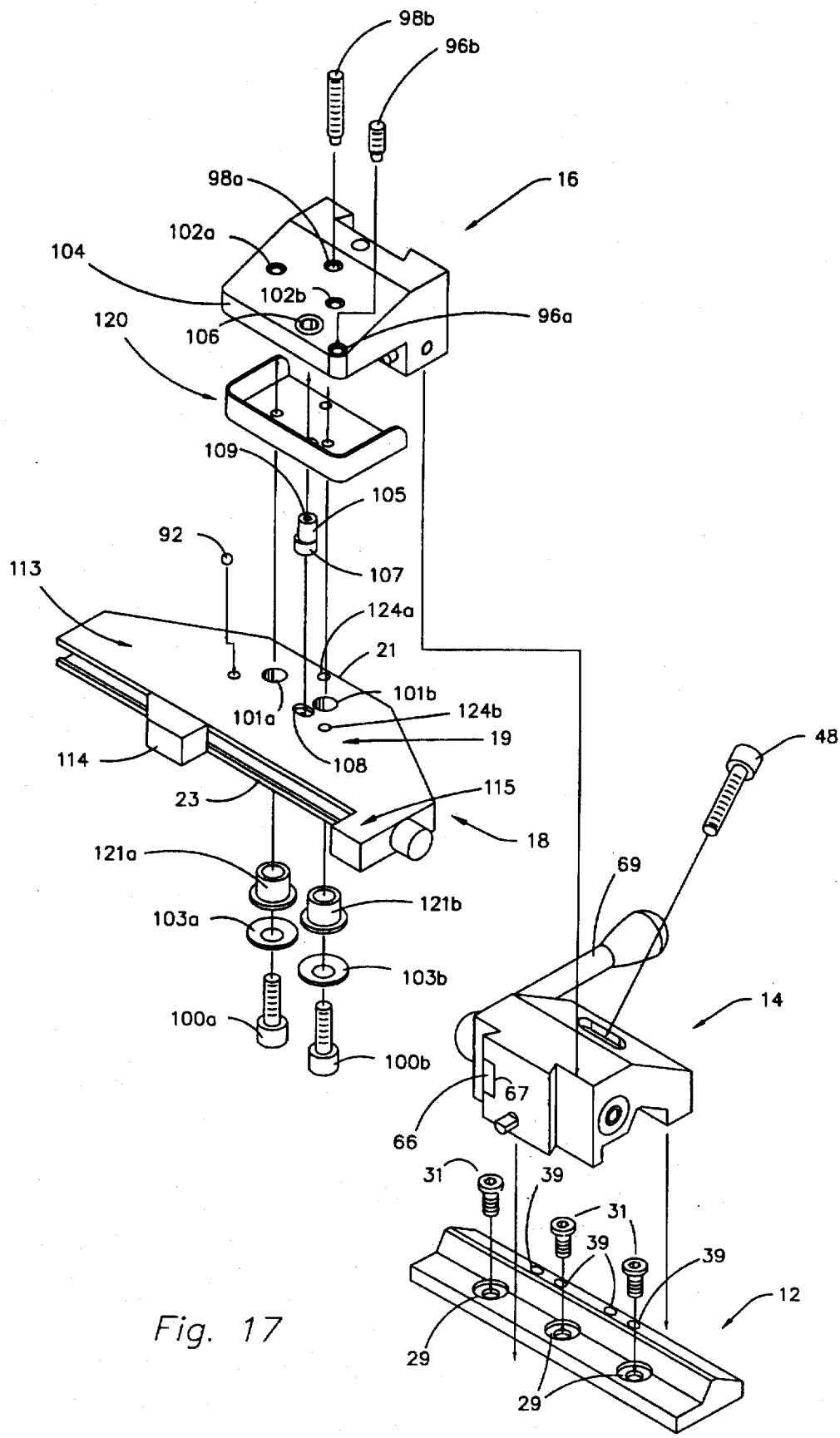
FIG. 17 is an isometric exploded view of the invention and the workpiece clamping means of FIG. 1 including dielectric means for electrically isolating the workpiece clamping means from the leveler head.

The rail front top surface is provided with countersunk openings 29 whose center axes are spaced-apart in a longitudinal alignment which is parallel to front side surface 30. The openings are spaced-apart a predetermined distance corresponding to the previously referenced table top openings 25. Thus, when secured with table fasteners 31 to the machine table, as shown in FIG. 17, rail surfaces 30,32 will be aligned exactly along the machine x axis.

The rail oblique top surface 34 is provided with top openings 39. Preferably, these openings are threaded and aligned so that their central axes are inclined relative to bottom 28 for a purpose to be hereinafter described.

With particular reference to FIGS. 5–10 of the drawings, the rail clamp 14 of the invention is shown in detail. The rail clamp is generally a solid body having an inner channel 41 that overlies rail 12 when adjustably attached thereto. The channel is defined by a front leg 42 and a back leg 43. Each of the legs have a respective flat bottom leg surface 44 for resting upon the machine table. The back leg is further defined by a flat inner channel surface 45 that extends perpendicularly from the corresponding bottom leg surface 44 to an oblique upper surface 49.

The aforementioned inner channel surface forms part of the back side of the inner channel cross-sectional outline which is substantially coextensive with, and slightly larger than, the cross-sectional outline of rail 12. In this manner, the rail clamp will conveniently overlie the rail whereby the respective outlines will have sufficient clearance to permit longitudinal movement along the axial extent of the rail for purposes of adjustment.

The exterior outline of the rail clamp is defined by a back sidewall 57 which extends upwardly from bottom leg surface 44 to an inclined top surface 46a. The inclined top surface merges into a rail top side 46b which extends to outer corners 52. The outer corners define the intersection between lateral side walls 61a,b and connector faces 51.

The connector faces form part of a leveler connector means to be hereinafter described. They extend perpendicularly from bottom leg surfaces 44 and are aligned parallel to inner channel surface 45. As so disposed, it can be seen that when inner channel surface 45 is drawn against back side surface 32 of the rail, the connector faces will be parallel to the x and z axes of the machining apparatus 26.

To facilitate a secure and complete engagement of the rail and rail clamp via backside surface 32 and inner channel surface 45, inclined top surface 46a is provided with a countersunk elongated slot 47. The slot extends through the upper thickness of the rail clamp above, and at an acute angle relative to, the inner channel surface. The slot axis is also coextensive with the axis of top openings 39. A threaded rail fastener 48 may then be used for insertion into the slot for engagement with corresponding threads in the openings 39.

It can be seen that because of the fastener's angular orientation, a strong force component directed perpendicular to, and inward from, inner channel surface 45 will result as the fastener is tightened. There will also be a downwardly directed force component to draw bottom leg surfaces 44 solidly against the machine reference table 24. The simultaneous action of each of the force components will produce a solid mating engagement between all of the reference surfaces.

As shown in FIG. 2, the inclined openings 39 are spaced at varying locations along the longitudinal extent of the rail. This allows the rail clamp to be positioned above any of said openings. The rail clamp may be further adjusted longitudinally within the constraints of the elongated slot 47.

In addition to the above, the rail clamp includes a leveler connector means 50 for engaging the leveler head 16. The connector means comprises opposing flat upstanding connector faces 51 which extend inwardly from respective outer corners 52 of the rail clamp front leg. The faces extend inwardly to a respective bevel corner 53 and incline back outwardly to define first and second oppositely flared surfaces 54,55. Each of the flared surfaces are flat and terminate at a central front leg face 56. The front leg face comprises a flat planar surface that is perpendicular to bottom leg surface 44 and is parallel to inner channel surface 45. Each of the flared surfaces are also perpendicular to the bottom leg surface 44.

As best shown in FIGS. 6–8 and 10, the leveler connector means further includes a locking means 58 for providing a secure and releasable connection with the aforementioned leveler head. The locking means comprises an elongated pivot shaft 59 extending through a central bore 60. The central bore extends transversely through about the middle of opposing lateral side walls 61a,b of the rail clamp. The central bore axis is preferably parallel with the connector faces and includes an enlarged area 62 which houses a cam element 63.

Extending perpendicular to the axis of the pivot shaft is lock element 64. The lock element is provided with an oblong opening 65 into which the cam element 63 extends. As arranged, rotation of the pivot shaft will rotate cam element 63 against the inside edges of the oblong opening. This will cause a reciprocating movement of lock element 64 within the enlarged area 62.

Lock element 64 is provided with an integral outwardly flared segment 66 which is coextensive with the second outwardly flared surface 55. The flared segment is located within recess 67 of the flared surface 55. It may be drawn inwardly from the recess into a locking position against a corresponding surface of the leveler head upon rotation of the aforementioned pivot shaft. This action will draw rail clamp surfaces 78a, 81a and 78b against the respective leveler head surfaces 51 and 54. In turn, the leveler head will become orthogonally aligned with the rail clamp, rail and machine references shown by reference numeral 8.

The pivot shaft includes an outer extension 68 to which is connected a lever 69. The lever conveniently allows a user to exert leverage on the pivot shaft for effecting a snug engagement of the flared segment against the aforesaid corresponding leveler head surface. Preferably, the lever comprises a torque handle which is equipped with a torque adjustment means, known in the art, that will permit a predetermined amount of tightening without exceeding the limits of the locking means assembly of parts.

As part of a leveler head adjustment means (to be hereinafter described), front leg face 56 is provided with an outwardly extending projection 70. The projection includes an upwardly facing abutment surface 71 and is preferably located proximate the center of the lower portion of the front leg face. The abutment surface is also preferably flat and parallel with bottom leg surfaces 44.

The leveler head 16 of the invention will now be described with particular reference to FIGS. 11–16. It comprises a generally solid body having an overall quadrilateral outline encompassing a connector portion 75 and an attachment portion 76.

The connector portion has a flat base area 74 from which extend opposing flat upstanding leveler faces 78a,b. The faces are perpendicular to the base area and extend inwardly from connector corners 79a,b to corresponding inner edges 80a,b. Respective outwardly angled surfaces 81a,b incline from the inner edges back outwardly a predetermined distance to a flat inner-face 82. As above-described, the angled surfaces, inner-face and leveler faces have a cross-sectional outline about identical to the corresponding outline of the leveler connector means 50. In this way, when the leveler head and rail clamp are engaged, the corresponding surfaces of each component can abut against each other.

The leveler head connector portion is provided with a vertical adjustment means 86 which engages the previously described abutment surface 71 of rail clamp projection 70. The adjustment means includes a recessed portion 83 which extends upwardly from base area 74 into the center part of inner face 82. It has a depth sufficient to accommodate the aforesaid projection 70 during engagement of the rail clamp and leveler head.

A vertical threaded screw opening 87 is provided extending from the top of the connector portion behind inner face 82 into the above-described recessed portion. Extending through the screw opening is a vertical adjustment screw 88 which has a free end 89. Rotation of the screw will cause the free end to operate against the abutment surface 71 and cause the overall leveler head to move vertically along its connection with the rail clamp. The screw opening 87 is preferably countersunk to accommodate the head of the screw and a compression spring 90. This prevents unwanted turning of the screw once the vertical height adjustment has been made.

Attachment portion 76 of the leveler head includes a downwardly-facing attachment surface 77. This surface is flat and perpendicular to leveler faces 78a,b. It is parallel to base area 74 and is vertically offset above the base area by an inside wall 85. The wall is flat and perpendicular to the attachment surface and is parallel to leveler faces 78a,b. From the inside wall, the attachment surface extends outwardly to define an underlying attachment area 84 for engaging a workpiece clamping means.

For explanatory purposes, a vise 18 and solid block 20 have been shown in FIGS. 1 and 17 as being illustrative of a workpiece and workpiece clamping means. It will be appreciated, however, that the specific clamping means being used will be dictated by the physical character of the workpiece and the type of machining being done. It is only important that the clamping means include a leveler head attachment region 19 as described hereinafter.

With reference to FIG. 17, vise 18 is shown which, in its most basic form, comprises a solid body 113 with an integral stationary jaw 115. A movable jaw 114, operated by a screw (not shown) is used to hold workpiece 20 in a predetermined manner. The vise rear wall 21 is preferably flat and perpendicular to the flat top surface of attachment region 19. It may also be parallel to a front wall surface 28 against which a workpiece can be abutted.

For adjustably securing a workpiece clamping means to the aforesaid attachment area, the leveler head is provided with a cant adjustment means, a lateral adjustment means and a securement means. The cant adjustment means functions to angularly orient a workpiece clamp, and workpiece clamped thereto, relative to a machine tool. Basic elements of the cant adjustment means comprises a pivot contact and two vertically adjustable contacts each of which are spaced from each other in a triangular pattern about the leveler head attachment portion 76. The contacts engage attachment region 19 of the workpiece and function to effect a tilting of the workpiece clamping means as needed for proper alignment.

With particular reference to FIGS. 11–17, the pivot contact is shown by a ball 92 which is constrained within seat 93. The ball and seat are positioned adjacent leveler corner 94 and extend from surface 77 into the underlying attachment area 84.

To provide a first one of said adjustable contacts, a first jack screw opening 96a is located at leveler corner 95. This corner is directly opposite corner 94 along a line coextensive with leveler head outer end 104. Threadably engaged in the opening is first jack screw 96b having a distal end 97.

Proximate the midpart of the leveler head attachment portion is the second adjustable contact comprising second jack screw opening 98a. Threadably engaged in the opening is a second jack screw 98b having a distal end 99. The location of this jack screw is offset from an imaginary line extending through the ball and first jack screw so that the triangular pattern between the three parts is completed.

The previously mentioned lateral adjustment means provides horizontal adjustment of the workpiece clamping means relative to the leveler head. It comprises a cam shaft 105 which rotates within a bushing 110 about an axis that is perpendicular to the attachment surface 77. The bushing is located within aperture 106 which extends through the attachment portion of the leveler head.

The cam shaft includes an oblong-shaped cam part 107 at its free end portion which extends below the attachment surface. It engages a corresponding oblong cam socket 108 in the surface of the attachment region 19 of the workpiece clamping means.

The upper end of the cam shaft is provided with means for rotating the shaft about its longitudinal axis. As shown, this comprises a hex socket 109 for allowing insertion of a manually operated implement.

With reference to FIGS. 11 and 15-17, the above-mentioned securement means will be described. This means comprises threaded fastener parts 100a,b that pass through corresponding openings 101a,b in the attachment region. The fastener parts engage corresponding threaded openings 102a,b in the leveler head. The fastening parts operate in conjunction with the cant and lateral adjustment means whereby once both of the adjustment means have the workpiece 20 in the desired position, the fastening parts can be tightened to lock together the leveler head and workpiece clamping means.

To facilitate the adjustment process, the fastener parts are preferably provided with biasing elements shown as spring washers 103a,b. The spring washers allow minor adjustments while at the same time inhibiting unwanted loosening of the assembly.

When the assembly of the invention is being used in conjunction with a wire EDM apparatus, it is sometimes necessary to electrically isolate the workpiece from the assembly and its connection to the machine table. The invention is readily adaptable to this circumstance whereby the leveler head and workpiece clamping means are provided with dielectric means to simply and effectively achieve the desired isolation.

As shown in FIG. 17, the dielectric means comprises a dielectric gasket 120 which is interposed between the attachment region 19 and attachment surface 77. It also includes dielectric sleeves 121a,b extending into openings 101a,b. Additionally, camshaft bushing 110 is constructed of a dielectric material. Still further, inside wall 85 is provided with dielectric posts 112 and pivot ball 92 is constructed of a dielectric material. Finally, attachment region 19 is provided with dielectric pads 124a,b for electrically isolating distal ends 97, 99 of the jackscrews.

To achieve the same precise referencing as with inside wall 85, the dielectric posts 112 will have outer ends which are precision machined to be flat and parallel to leveler faces 78a,b. In all other respects, the leveler head workpiece clamping means will interconnect and adjust in a normal fashion.

For purposes of describing operation of the assembly and, assuming the vise shown is the desired clamping means, workpiece 20 will be inserted therein and secured in the desired position with moveable jaw 114. The leveler head will then be placed over attachment region 19 and fastener parts 100a,b will be passed through openings 101a,b and form a threaded engagement with threaded openings 102a,b. The fasteners will bring the top surface of attachment region 19 into slight engagement with pivot ball 92 and leveler head attachment surface 77 or with first and second distal ends 97, 99 and pivot ball 92. In this position, connector portion 75 of the leveler head is slipped down over the leveler connector means 50 of the rail clamp. Lever 69 is moved to a closed position whereby flared segment 66 will move inwardly away from recess 67 and push leveler faces 78a,b tightly against connector faces 51. It will also move angled surface 81a against flared surface 54.

Assuming the rail clamp has already been pre-located and securely fastened to the rail as described previously, the workpiece may now be more precisely positioned relative to the machining tool. This step is accomplished by utilizing the previously described multiple adjustment capabilities of the leveler head. Upon achieving the desired location, the fastener parts 100a,b are then finally tightened.

From the above, it can be seen that the leveler head, vise and workpiece form a convenient partial assembly that can be pre-rigged at an assembly station outside the machining apparatus. This can be accomplished with a simulated rail clamp stand (not shown) which has been positioned on a flat work table along the same orthogonal reference lines as those used by the machining apparatus. Thus, as soon as the machine is finished with one workpiece, it can be quickly removed and replaced with another. And, regardless of the specific items being worked upon, or the specific machining tool being utilized, the invention provides for the rapid exchange of workpieces at predetermined precisely located positions.

While the invention has been described with respect to preferred embodiments, it will be apparent to those skilled in the art that various modifications and improvements may be made without departing from the scope and spirit of the invention. Accordingly, it is to be understood that the invention is not to be limited by the aforementioned specific illustrative embodiments, but only by the scope of the appended claims.

I claim:

1. A method of positioning a workpiece at a predetermined position relative to the machine tool of a machining apparatus having a working surface adjacent said tool wherein said method utilizes a base module secured to said working surface and a release module engaged to said base module, said release module including a leveler head having a pivot contact and a first contact defining an imaginary first line extending across said leveler head and, a second contact located on said leveler head offset from said first line forming a triangular pattern with an imaginary second line of said pattern intersecting said pivot contact and said second contact, comprising the steps of:

A. securing said workpiece to said release module;
   B. rotating said workpiece about said second line by vertically adjusting said first contact until the desired orientation is achieved; and,
   C. rotating said workpiece about said first line by vertically adjusting said second contact until the desired orientation is achieved.

2. A method of positioning a workpiece at a predetermined position relative to the machine tool of a machining apparatus having a working surface adjacent said tool wherein said method utilizes a leveler head adjustably interconnected to said working surface and a workpiece clamping means, said leveler head including a pivot contact and a first contact defining an imaginary first line extending across said leveler head and, a second contact located on said leveler head offset from said first line forming a triangular pattern with an imaginary second line of said pattern intersecting said pivot contact and said second contact, comprising the steps of:

A. securing said workpiece to the workpiece clamping means;

B. slightly engaging said workpiece clamping means to said leveler head so that said first, second and pivot contacts abut against said workpiece clamping means;

C. rotating said workpiece clamping means about said second line by vertically adjusting said first contact until the desired orientation is achieved;

D. rotating said workpiece clamping means about said first line by vertically adjusting said second contact until the desired orientation is achieved; and, E. tightening the engagement between said workpiece clamping means and said leveler head.

3. A method of orienting a workpiece clamping means relative to a leveler head which are initially slightly engaged together, said leveler head having a pivot contact and vertically adjustable first and second contacts arranged in a triangular pattern wherein one leg of said pattern is an imaginary first line intersecting said pivot contact and said first contact and another leg of said pattern is an imaginary second line intersecting said pivot contact and said second contact, said contacts extending from said leveler head into engagement with said workpiece clamping means, comprising the steps of:

A. rotating said workpiece clamping means about said second line by vertically adjusting said first contact until the desired orientation is achieved;

B. rotating said workpiece clamping means about said first line by vertically adjusting said second contact until the desired orientation is achieved; and C. tightening the engagement between said workpiece clamping means and said leveler head.

4. The method of claim 3 wherein said leveler head includes a lateral adjustment means extending into engagement with said workpiece clamping means, including the step of:

after step B., using said lateral adjustment means to rotate said workpiece clamping means about an orthogonal line perpendicular to said first line until the desired orientation is achieved.

* * * * *